United States Patent
Clapp et al.

(10) Patent No.: US 11,456,163 B1
(45) Date of Patent: Sep. 27, 2022

(54) METHOD OF IMPROVING AN ANALYTICAL INSTRUMENT AND IMPROVED ANALYTICAL INSTRUMENTS

(71) Applicant: Government of the United States, as represented by the Secretary of the Air Force, Wright-Patterson AFB, OH (US)

(72) Inventors: Benjamin A. Clapp, Huber Heights, OH (US); Mitchell H. Rubenstein, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 291 days.

(21) Appl. No.: 16/877,811

(22) Filed: May 19, 2020

Related U.S. Application Data

(60) Provisional application No. 62/863,971, filed on Jun. 20, 2019.

(51) Int. Cl.
| | |
|---|---|
| *H01J 49/00* | (2006.01) |
| *G01N 30/88* | (2006.01) |
| *G01N 30/06* | (2006.01) |
| *H01J 49/26* | (2006.01) |

(52) U.S. Cl.
CPC .......... *H01J 49/0009* (2013.01); *G01N 30/06* (2013.01); *G01N 30/88* (2013.01); *H01J 49/26* (2013.01)

(58) Field of Classification Search
CPC ...... H01J 49/0009; H01J 49/26; G01N 30/06; G01N 30/88
See application file for complete search history.

(56) References Cited

U.S. PATENT DOCUMENTS

2002/0145109 A1* 10/2002 Doroshenko ........... H01J 49/40
250/287

OTHER PUBLICATIONS

Edgerley, D. A.; Techniques for Improving the Accuracy of Calibration in the Environmental Laboratory, WTQA '98—14th Annual Waste Testing & Quality Assurance Symposium, 1998, 181-187.

* cited by examiner

*Primary Examiner* — David A Vanore
(74) *Attorney, Agent, or Firm* — AFMCLO/JAZ; James F. McBride

(57) ABSTRACT

The present invention relates to methods of improving analytical instruments and improved analytical instruments. The aforementioned method employs a calibration correction module that calibrates the machine to effect measurements with the minimum possible relative squared error. This results in a significant improvement of the analytical instrument in question that leads to more precise and accurate results.

1 Claim, No Drawings

METHOD OF IMPROVING AN ANALYTICAL INSTRUMENT AND IMPROVED ANALYTICAL INSTRUMENTS

CROSS-REFERENCE TO RELATED APPLICATION

The present application claims priority to U.S. Provisional Application Ser. No. 62/863,971 filed Jun. 20, 2019, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to methods of improving an analytical instruments and improved analytical instruments.

BACKGROUND OF THE INVENTION

Current analytical instruments, such as gas or liquid mass spectrophotometers are used to determine the mass of an analyte in a sample. Unfortunately, gas and liquid spectrometry calibration modules result in high relative inaccuracy for estimates involving low analyte quantities. Applicants recognized that the source of such problem was weighting error in the calibration based upon absolute rather than relative, or percentage based values. As a result, low analyte quantity samples have very little influence on calibrations, and exaggerate the impact of any outliers. Thus producing a more error-prone analytical instrument, especially for instruments that are determining the mass of low analyte quantity samples.

As a result of the aforementioned recognition Applicants, developed a calibration correction module that can be inserted into an analytical instrument to improve such instrument's ability to provide more precise and accurate data. Such module can easily be inserted into an analytical instrument to correct the aforementioned deficiency. Such module has the additional benefit that real time, accurate mass determinations of low analyte quantity samples can be obtained.

SUMMARY OF THE INVENTION

The present invention relates to methods of improving analytical instruments and improved analytical instruments. The aforementioned method employs a calibration correction module that calibrates the machine to effect measurements with the minimum possible relative squared error. This results in a significant improvement of the analytical instrument in question, which leads to more precise and accurate results.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein an analytical measurand means a measurand that is a concentration of mass to be measured.

As used herein a non-analytical measurand means a measurand that is not a concentration of mass to be determined but instead a physical parameter, for example pressure, temperature, kinetic energy etc.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Improved Analytical Instruments and Correction Module

For purposes of this specification, headings are not considered paragraphs and thus this paragraph is Paragraph 0015 of the present specification. The individual number of each paragraph above and below this Paragraph can be determined by reference to this paragraph's number. In this paragraph 0015, Applicants disclose an instrument for providing an accurate analytical or non-analytical measurand, comprising a correction module programmed to:

a) minimize one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand to yield values for the variables a and b; and insert a sensor response y from a separate data set, as well as the a and b values from Step a) above into the equation below to yield an approximate value for x $$ay + b \cong x$$

wherein x is the accurate measurand; or
b) insert a sensor response y, as well as the a and b values obtained by the minimization one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand; into the equation below to yield an approximate value for x $ay+b \cong x$ wherein x is the accurate measurand.
said instrument preferably being selected from the group consisting of as gas chromatograph mass spectrometer; liquid chromatograph mass spectrometer, ultraviolet detector, visible detector, fluorescence detector; electrochemical detector; ion chromatograph visible detector and ion chromatograph electrochemical detector.

Applicants disclose an instrument for providing an accurate analytical or non-analytical measurand according to Paragraph 0015 wherein said correction module comprises an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Applicants disclose a correction module programmed to:
a) minimize one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand to yield values for the variables a and b; and insert a sensor response y from a separate data set, as well as the a and b values from Step a) above into the equation below to yield an approximate value for x $ay+b \cong x$ wherein x is the accurate measurand; or
b) insert a sensor response y, as well as the a and b values obtained by the minimization one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand; into the equation below to yield an approximate value for x $ay+b \cong x$ wherein x is the accurate measurand.

Applicants disclose a correction module according to Paragraph 0017, comprising an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Method of Improving an Analytical Instrument and Obtaining Improved Data

Applicants disclose a method of obtaining improved data, said method comprising
a) minimize one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand to yield values for the variables a and b;
b) insert a sensor response y from a separate data set, as well as the a and b values from Step a) above into the equation below to yield an approximate value for x $ay+b \cong x$ wherein x is the measurand.

Applicants disclose a method of obtaining improved data, said method comprising:
a) inserting a sensor response y, as well as the a and b values obtained by minimizing one of the following formulas:
  (i)
  (ii)

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand;
into the equation below to yield an approximate value for x $ay+b \cong x$ wherein x is the measurand. Such minimization can be achieve by using numerical analysis or by a search heuristic technique.

Applicants disclose a method of obtaining improved data according to Paragraphs 0019 through 0020 wherein:

a) $x_i$ is an analytical or non-analytical measurand, preferably, when such measurand is an analytical measurand, said analytical measurand is selected from the group consisting of a gas chromatographic mass spectrometry measurand; liquid chromatographic mass spectrometry measurand, ultraviolet measurand, visible measurand, ultraviolet fluorescence measurand; ion chromatography visible measurand and electrochemistry measurand; and electrochemical gas sensor measurand; and b) $y_i$ is an analytical or non-analytical response, preferably, when such response data is an analytical input, said analytical input is selected from the group consisting of: gas chromatographic mass spectrometric response areas, electrochemical oxygen sensor response data, temperature measurement; noise measurement; and pressure measurement.

Variable Definitions n=The total number of measurements taken in an analytic run.

$x_i$=The ith measurand from an analytic run.

$y_i$=The ith sensor response value from an analytic run.

$ay_i+b$=The linear function approximating $x_i$, based upon $y_i$ and two given coefficients a and b. Note that b may be constrained to 0 in some methods.

$a_j$, $b_j$=The value of a and b given by the jth iteration of an iterative process wherein each successive pair of values for $a_j$ and $b_j$ improves accuracy under the definition being utilized.

$a_j y_i + b_j - x_i$=The difference between the linear function estimate of the ith measurand generated using $a_j$ and $b_j$ and the measurand, referred to as the absolute error.

Formula Summaries $|a_j y_i + b_j - x_i|$ is the absolute value of the difference between the linear function estimate of the ith measurand generated using $a_j$ and $b_j$ and the measurand, referred to as the absolute error.

$$\left| \frac{a_j y_i + b_j - x_i}{x_i} \right|$$

is the difference between the linear function estimate of the ith measurand generated using $a_j$ and $b_j$ and the measurand as a proportion of the estimate, referred to as the relative error.

$$\sum_{i=1}^{n} |a_j y_i + b_j - x_i|$$

is the sum of all absolute errors generated when using the pair $a_j$, $b_j$ to estimate all $x_i$ using their respective paired $y_i$ for a given analytic run.

$$\sum_{i=1}^{n} \left| \frac{a_j y_i + b_j - x_i}{x_i} \right|$$

is the sum of the absolute values of all relative errors generated when using the pair $a_j$, $b_j$ to estimate all $x_i$ using their respective paired $y_i$ for a given analytic run.

$$\sum_{i=1}^{n} (a_j y_i + b_j - x_i)^2$$

is the sum of the squares of all absolute errors generated when using the pair $a_j$, $b_j$ to estimate all $x_i$ using their respective paired $y_i$ for a given analytic run.

$$\sum_{i=1}^{n} \left( \frac{a_j y_i + b_j - x_i}{x_i} \right)^2$$

is the sum of the squares of all relative errors generated when using the pair $a_j$, $b_j$ to estimate all $x_i$ using their respective paired $y_i$ for a given analytic run.

Error Formulae

The standard error formula is $$\sum_{i=1}^{n} (a_j y_i + b_j - x_i)^2.$$

This formula gives the sum of the squared absolute errors. It is computationally simple to solve, because it can be solved using the Least Squares method, and generally has a unique solution for any given set of data. However, in many contexts, the error measured by the sum of the squared absolute errors is not the type of error of greatest concern.

Error Formulae Example

Consider the data set (1,1), (2,2), (5,5), (10,10), (50,100). Utilizing the Least Squares method to minimize the sum of squared error, we arrive at $a \cong 0.48$, $b \cong 3.70$. This does minimize the sum of squared absolute errors, by definition. However, the relative error varies wildly. The estimate of $x_1$, given above as 1, is 4.18, off by 300% of the true value of the measurand. The estimate given at $x_6$, given above as 50, is 51.37, off by about 3%. The sum of all relative error is 5.44. Without attempting a more complex solution, a=1, b=0 exactly estimates all but (50,100), giving a sum of squares of all relative errors of exactly 1. This simple method, which does not minimize the sum of the squares of the percentage errors, provides a more than 80% improvement over Least Squares in estimating the measurand.

Alternative Formulae

The function $$\sum_{i=1}^{n} \left( \frac{a_j y_i + b_j - x_i}{x_i} \right)^2$$

more directly minimizes the sum of squared relative errors. However, minimization of the sum of the squares of all relative errors cannot be performed using the Least Squares method. Instead, the solution of this equation is performed using numerical analysis methods, most of which comprise the generation and iterative improvement of a feasible solution. An alternative method is to use the function $$\sum_{i=1}^{n} \left| \frac{a_j y_i + b_j - x_i}{x_i} \right|.$$

This alternative method is effective, but has the disadvantage of non-unique optima, and does not mitigate skewing of error as effectively.

Generating an Initial Solution

The primary concern when generating an initial solution is ensuring that it is sufficiently close to the true global optimum to converge quickly and consistently to that global optimum. The necessity of optimizing two interdependent variables in parallel adds significant complexity and delays to our optimization process. Consequently, a good initial solution is exceeding important. Given the simplicity of calculating the sum of the squares of all relative errors for comparative purposes, it is simpler to evaluate multiple potential initial solutions than to risk attempting a poor initial solution. In some circumstances, the parallel implementation of every method may be considered, to ensure that the initial solution chosen has the lowest sum of squared relative errors.

Formula for Initial Solutions

Generating an effective initial solution significantly reduces the number of iterations of the numerical analysis method required to arrive at a solution of specified quality, but most numerical methods will converge regardless of the initial solution used. Three methodologies for calculating an initial solution are recommended. The first is the utilization of the output of the Least Squares methodology applied to the sum of the squares of absolute error. The second is utilizing $$a = \sum_{i=1}^{n} \frac{x_i}{y_i}, b = 0.$$

The third is utilizing $$a = \sum_{i=1}^{n} \frac{x_n - x_1}{y_n - y_1}, b = x_1 - \frac{x_n - x_1}{y_n - y_1} y_1.$$

As an aside, one advantage of utilizing the Least Squares initial solution is that definitionally, the sum of the square of the relative errors is no higher than that generated using Least Squares methodology.

Techniques for Finding Minimum Error Solutions

Several numerical analysis techniques are useable for either the formula $$\sum_{i=1}^{n} \left( \frac{a_j y_i + b_j - x_i}{x_i} \right)^2$$

or the formula $$\sum_{i=1}^{n} \left| \frac{a_j y_i + b_j - x_i}{x_i} \right|.$$

However, with the exception of quasi-gradient methods, most share the necessity for iteratively solving for each of the variables in turn, repetitively. This is a multi-step process an example of which entails:

1. Generate an initial solution, as detailed above. This gives us $a_1$, $b_1$
2. Designate an error tolerance, or a number of desired iterations. Since these operations are performed in floating point, it is also possible simply to iterate until no improvement occurs; however, this could take some time.
3. Choose to optimize either a or b first. For our example, we choose a.
4. Choose a step size, z. We will use z=a/2; when we optimize b, we will use z=b/2.
5. Solve the chosen objective function—either $$\sum_{i=1}^{n} \left( \frac{a_j y_i + b_j - x_i}{x_i} \right)^2 \text{ or } \sum_{i=1}^{n} \left| \frac{a_j y_i + b_j - x_i}{x_i} \right|,$$

using $a_1$, $b_1$, and then again, substituting $a_1-z$ and $a_1+z$ for $a_1$ when the equation is solved the second and third times, respectively.

6. If either the solution using $a_1-z$ or $a_1+z$ returns a lower objective function value than using $a_1$, let $a_2$ be equal to that value, and go to Step 8.
7. Otherwise, reduce the step size z by half, and go to Step 5.
8. Repeat Steps 4 through 7, optimizing b, and using $a_2$ instead of $a_1$.
9. If the amount of improvement achieved between $a_1$, $b_1$ and $a_2$, $b_2$ is less than the designated error tolerance, or if the designated number of iterations have been performed, terminate the algorithm.
10. $a_n$, $b_n$ is the estimate of the optimal system.

Nonlinear Data

In general, this technique is described in terms of linear data. However, it is easily extended to response functions which have a nonlinear relationship by transforming the response signal before the linear methods are applied. Most commonly, this will take the form of an exponential relationship between the measurand and the response signal, which can be corrected by taking the logarithm of the data, or using it as an exponent, allowing the data to be treated as linear.

EXAMPLES

The following example illustrates particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: A Calibration Module

As an example, a calibration correction module is comprised of an analog to digital converter, an input/output controller, a random access memory unit, a central processing unit, a hard drive memory unit, and a unifying computer bus system. Signal is received via the analog-to-digital converter from an analytic sensor system, and the calibration is retrieved via the input/output controller.

Example 2: An Instrument Comprising a Calibration Correction Module

In the instance of a gas-chromatograph mass spectrometer, the input received would be from both the gas-chromatograph and mass spectrometer, distinguishing individual chemical signatures based upon the mass spectrometer, and assessing the strength of signal through the gas-chromatograph.

Example 3: Instrument Utilizing a Calibration Correction Module vs. An Instrument Not Utilizing a Calibration Correction Module The following pairs of measured relative response factors and environmental concentrations will be used as a basis for comparing the performance and output of an instrument utilizing a calibration correction module and an instrument not using a calibration correction module.

1:1, 2:2, 5:5, 10:10, 50:100.

For the purposes of this example, the 50:100 is a random error. The true value for most accurately estimating an environmental concentration based upon measured relative response factor, is simply 1, and the intercept should be 0. Without utilizing a calibration correction module, the machine will return a coefficient of 0.4800 with an intercept of 2.274. Utilizing the calibration correction module, the coefficient will be estimated as 0.63, and the intercept will be estimated as 0.51. The following constitute the true value paired with the instrument's estimate without the calibration correction module:

1:2.8, 2:3.2, 5:4.7, 10:7.1, 50:50.2

This is contrasted with the following, which constitute the true value paired with the instrument's estimate with the calibration correction module:

1:1.1, 1:1.8, 5:3.7, 10:6.8, 50:63.5

Example 4 Gas-chromatograph Mass Spectrometer Comprising a Correction Module

A gas-chromatograph mass spectrometer is calibrated in the laboratory setting for field use. The calibration is performed using five samples containing, respectively, one part per one hundred billion dichloromethane, two parts per one hundred billion dichloromethane, five parts per one hundred billion dichloromethane, ten parts per one hundred billion dichloromethane, and fifty parts per one hundred billion dichloromethane. Sensor readings form the gas-chromatograph mass spectrometer indicate area under the curve of one, two, five, ten and one hundred corresponding to dichloromethane in the calibrating samples. The agent used to correct for machine variance has a constant area in the five samples, and so the corrected gas-chromatograph mass spectrometer readings are identical to the uncorrected areas. An initial guess for the least squared relative error solution is the least squared absolute error solution, which gives a slope of 0.48 and an intercept of 2.27. This solution is subjected to iterative improvement via the built-in module in the gas-chromatograph mass spectrometer, applying the technique given in 0028, coded in C++, Matlab, VBA, C#, or another coding language. Using a designated tolerance of 0.01, the module returns a slope of 0.63, and an intercept of 0.51. These values are recorded in the machine to adjust future estimates. The gas-chromatograph mass spectrometer (or a similar machine using the same calibration) is then used to estimate the concentration of dichloromethane in a sample obtained in an industrial warehouse. The gas-chromatograph mass spectrometer estimates an area under the curve, corrected by variation in the baseline agent area, of 2. Utilizing the calibration values, the machine outputs to its user an estimated concentration of 1.8 parts per hundred billion.

What is claimed is:

1. An analytical instrument for providing an accurate analytical or non-analytical measurand, said instrument being selected from the group consisting of gas chromatograph mass spectrometer; liquid chromatograph mass spectrometer, ultraviolet detector, visible detector, fluorescence detector; electrochemical detector; ion chromatograph visible detector and ion chromatograph electrochemical detector, said analytical instrument comprising a correction module, said correction module comprising an input/output controller, a random access memory unit, a hard drive memory unit, and a unifying computer bus system, said input/output controller being configured to receive a digital signal and transmit said signal to a central processing unit and retrieve a signal comprising said accurate analytical or non-analytical measurand from said central processing unit said correction module programmed to:

a) minimize one of the following formulas:

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand to yield values for the variables a and b; and insert a sensor response y from a separate data set, as well as the a and b values from Step a) above into the equation below to yield an approximate value for x $$ay + b \cong x$$

wherein x is the accurate measurand; or b) insert a sensor response y, as well as the a and b values obtained by the minimization one of the following formulas:

$$\sum_{i=1}^{n}\left(\frac{a_j y_i + b_j - x_i}{x_i}\right)^2 \quad \text{(i)}$$

$$\sum_{i=1}^{n}\left|\frac{a_j y_i + b_j - x_i}{x_i}\right| \quad \text{(ii)}$$

wherein $y_i$ is the ith value of the sensor response and $x_i$ is the ith value of the measurand; into the equation below to yield an approximate value for x $$ay + b \cong x$$

wherein x is the accurate measurand.

* * * * *